Jan. 14, 1969    H. C. VIDAL    3,421,326
CONSTRUCTIONAL WORKS
Filed March 26, 1964

United States Patent Office 3,421,326
Patented Jan. 14, 1969

3,421,326
CONSTRUCTIONAL WORKS
Henri Charles Vidal, 17, Rue Armengaud,
Saint-Cloud, Hauts-de-Seine, France
Filed Mar. 26, 1964, Ser. No. 354,947
Claims priority, application France, Mar. 27, 1963,
929,421
U.S. Cl. 61—39    16 Claims
Int. Cl. E02d 5/00; E02b 7/06

ABSTRACT OF THE DISCLOSURE

Earth reinforcement constructed by assembling a mass of pulverulent material frictionally bonded by elongated frictional elements which extend through the mass of particles. The particles frictionally engage the surface of the elements in a boundary layer and sufficient normal force is applied by internal pressure in the mass to resist relative movement of the boundary layer along the elements. Additional particles fill the space between the boundary layers of adjacent elements. Also abutments provided near the ends of the elements contain the particles along the exterior of the mass.

---

The first works constructed by man borrowed their essential materials from nature, mainly from the soil. Thus, among the oldest known structures, ditches, embankments, canals, huts, etc., were made of earth. Even at the present day, in some regions cob work is used for the construction of buildings, that is to say a mixture of clay and straw and hay.

During the course of the centuries, scientific progress has led to a reduction in the use of earth as a constructional material. Thus, reinforced concrete, although it uses constituents taken from the ground, the aggregates—in most cases after treatment (crushing, screening, washing, etc.)—requires the use of two constituents of essentially industrial origin: steel for the reinforcements and cement for the bond between aggregates and reinforcements.

It is only in the course of the last few days that due to the general introduction of earthmoving machines and the development of soil mechanics, many extremely technical works have been constructed under economical conditions from earth: dikes, roads, airfield runways, dams, etc.

The present invention proposes providing a new use of earth as a constructional material. It relates more particularly to a constructional work characterised in that it comprises mainly granular elements and reinforcements arranged in such a manner that these elements are maintained relatively to one another either by direct friction with the reinforcements or by friction with other elements in contact with the reinforcements, the assembly thus forming a volume which has cohesion and good resistance.

By "granular elements" there should be understood natural or artificial particles, and the term "reinforcement" is used to mean elements of considerable length which are resistant to tractive forces, such as those used in reinforced concrete and in reinforced plastics.

Whereas in a mass of non-coherent earth, the only equilibrium factor is due ot the effect of the internal friction of the particles in a work according to the invention the friction between particles and reinforcements is an additional stability factor which, combined with the friction of the particles with one another, makes it possible to obtain equilibrium-state contours or stable volumes which would be impossible if the reinforcements were not present. Thus, according to the invention, cohesion is obtained by the association of two types of elements, particles and reinforcements. In the works according to the invention, cohesion therefore has a very different origin from that which characterises masses consisting of concrete whether reinforced or otherwise, where it is due to the rigid connection created by the setting and hardening of the cement, and also different from cob work constructions where the cohesion is created by the adhesive action of the clay.

In the works according to the invention, the reinforcements make their action felt on a certain zone which surrounds them, but it will be apparent that even if the reinforcements are extended to the free surface of the work, this action, which generates cohesion, is less effective on the free surface where the pressure of the particles tends to push these out of the mass, so that in most cases it is necessary to provide on the free surface of a work according to the invention a means for retaining the particles which are situated on the surface or in the vicinity of the surface.

In many cases, this means is constituted by a kind of cladding distinct from the particles and the reinforcements; it will be referred to hereinafter as the "skin." This skin can be constructed in various forms. One possible form of embodiment is constituted by U-shaped elements whose limbs serve both to anchor them in the mass of particles and to allow them to be juxtaposed with one another. This skin does not properly speaking play any part in the stability of the work, being merely intended to contain the particles arranged near the free surfaces of the work. Therefore, it must be capable of resisting the local stresses whilst being capable of flexibility which enables it to adapt itself to possible deformations.

To simplify, the association of particles and reinforcements which is the basic feature of works constructed according to the present invention will be referred to as "reinforced earth."

Such works may be of many different kinds and can have all kinds of forms. However, the main field of use for such reinforced earth concerns heavy works, that is to say those whose free surface in relation to the total volume of the work is relatively small. This means that the works according to the invention will be mainly dikes, foundation masses, dams, coffer-dams, tunnels, etc., although lighter works such as pillars, beams and arches are not excluded.

The works constructed according to the present invention afford many advantages.

They are economical and easy to put into use since one of their constituents, earth, can be in most cases found on the building site itself and put into position with the usual site machinery, whilst the light elements, reinforcements and skin, can be handled either by hand or with small lifting machines.

Works made of reinforced earth, whilst enjoying the benefits of the strength required for maintaining them, do not have the rigidity of works made of concrete or reinforced concrete, so that they can adapt themselves to deformations, either normal or accidental deformations, of the medium with which they are in contact. More particularly, they are capable of resisting when the foundation soil is poor.

Calculating reinforced earth works is relatively simple and is based more especially on the methods involved in the strength of materials, soil mechanics and the mechanics of reinforced concrete. The fact that the reinforced earth constructional elements are generally elastic contributes to easy calculation. Furthermore, it is easy to construct small-scale models in reinforced earth to confirm or establish more exactly the results of the calculations.

Works made of reinforced earth can easily be demolished, and when this is necessary it is easy to recover the more expensive elements, the reinforcements and skin. This is an obvious advantage in the case of temporary works. For permanent works, this advantage is not as paradoxical as it appears; in fact, the acceleration of technical progress often has the result of making obsolete works which have been designed to "last for ever."

The features and advantages of the invention will become more apparent during the following description.

In the accompanying drawings, given merely by way of example.

(I) *General remarks*

Figure 1:
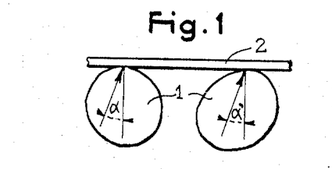
FIG. 1 is a diagram illustrating the friction between particles and reinforcements which gives the reinforced earth its cohesion.

FIG. 1 shows diagrammatically the bond by friction between two particles 1 and a reinforcement 2 which gives cohesion to the material constituting the works according to the invention, referred to hereinafter as "reinforced earth." When certain conditions of adhesion defined hereinafter are observed, the forces transmitted by the particles to the reinforcement form, with the corresponding perpendicular, angles $\alpha$, $\alpha'$ which are less than the physical friction angle between particles and reinforcement, so that the particles 1 are closely bonded to the reinforcement 2 and consequently to all the other particles in contact under the same conditions with the reinforcement.

Figure 2:
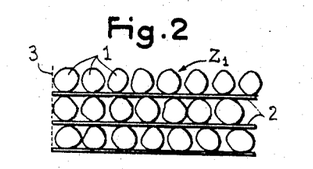
FIG. 2 is a diagrammatic view showing a stack of particles and reinforcements the vertical facing of which is stable.

The assembly $Z_1$ of FIG. 2 is constituted of alternate layers of a single thickness of particles 1 and reinforcement 2 in the form of horizontal strips. Owing to the fact that each particle is in contact with the two adjacent reinforcements, the vertical face 3 of this stack is stable. Of course, this is a theoretical case, since, in principle, the reinforcements are arranged in the volume of reinforced earth at a distance from one another which is greater than the size of a particle. The cohesion of the reinforced earth is none the less assured in this case also, as will be shown hereinafter, provided there is suitable distribution of reinforcements, and special arrangements are made if necessary to guarantee the stability of certain faces.

In most cases, in fact, the cohesion has to be reinforced on the free surface of a work of reinforced earth, since along these surfaces the reinforcements exert on the particles only a limited action and the particles near these surfaces have to be retained by an appropriate means.

Figure 3:
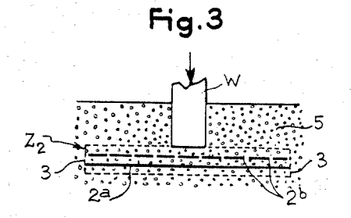
FIG. 3 is a diagrammatic view showing a foundation slab of reinforced earth.

FIG. 3 shows a foundation slab $Z_2$ of a pillar W subjected to vertical loads, wherein two beds of horizontal reinforcements 2a, 2b perpendicular to one another are arranged. On the free vertical surfaces 3 of the slab, the particles of the reinforced earth are, in this example, contained and stabilised by the earth 5 in which the foundation slab and the lower portion of the pillar are embedded.

In most cases, with a volume of reinforced earth of any form, there is provided an independent means for ensuring the cohesion of the particles at the free surface of the reinforced earth work. This means will be referred to as a "skin" in the description which follows.

Generally speaking, the skin is to be sufficiently strong locally to retain the particles of earth which are comprised between two neighbouring reinforcements and which are situated near the surface of the reinforced earth mass.

But it must also be sufficiently flexible in general to follow all deformations of the volume of reinforced earth, integrally therewith, since the earth even though reinforced can be subjected to relatively considerable deformations (particularly compacting). If the face were rigid, it would necessarily be in contact with elements externally of the reinforced earth mass (the supporting soil for example) and would transmit considerable supplementary external forces which may not be properly understood, making the reinforced earth lose completely its character as a uniform constructional material.

Finally, the skin is to have a protective function, resisting impacts and the action of erosion exerted by the external medium, and is to be designed in such a manner that it is extremely easy to put the skin into position as well as the earth and reinforcements.

Figure 4:
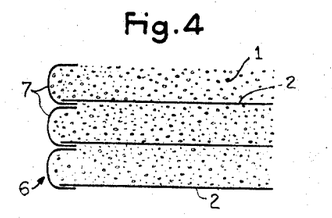
FIG. 4 is a schematic view showing a form of embodiment of skin according to the invention.
Figure 5:
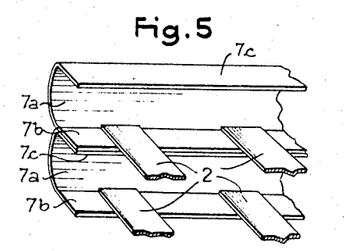
FIG. 5 is a perspective view of the skin embodiment of FIG. 4.

A typical example of skin is shown in FIGS. 4 and 5 in the case of a vertical face. According to this form of embodiment, the skin 6 is constituted by a stack of horizontal elements 7 which are of U-shaped cross-section, filled with the particles 1 of the work which are thus contained by the base 7a of the elements. The flat limbs or flanges 7b, 7c of the elements permit of superposing the elements on one another, anchoring them in the mass of particles and connecting them to the reinforcements 2.

(II) *The constituents of works of reinforced earth*

*Particles.*—The term "particle" designates any element the form of which approximates to that of a sphere, that is to say which does not have any major dimension. The particles used in the works according to the invention are in most cases taken from all kinds of soil encountered in nature. Although, in the foregoing, reference has been made implicitely to particles taken from soils of the "pulverulent" type, that is to say not having any natural cohesion, it will be apparent that the term "particle" covers agglomerates formed of "coherent" earth.

Furthermore, if the term "earth" is used as synoymous with "particles," it should be understood that this does not exclude particles which do not originate from the ground, being for example manufactured industrially with any desired materials and in all kinds of forms.

The grain size of the particles may be optional (powders, sands, gravels, stones, rough stone etc.) provided that the maximum size of the particles is compatible with the strength of the reinforcements and the skin used in the work being constructed. Thus, the work consisting of rough stone could in certain cases require the use of reinforcements and skin of a thickness which would make its price prohibitive.

*Reinforcements.*—The term "reinforcement" includes any element capable of withstanding considerable tractive forces. In the construction of works made of reinforced earth, it is possible to use all the kinds of reinforcements which are used more particularly in reinforced concrete and in articles made of reinforced plastic material.

Therefore, these reinforcements may be of various different kinds, such as panels, strips, bars, wires, cables, latticework, grids, felts, etc. The materials of which they are made may also be chosen from a wide range of materials: metals, textile materials, wood (more particularly in the form of plywood), plastic materials, glass etc.

It will be noted that the reinforcements of reinforced earth works are also to have inherent characteristics which are connected with their conditions of use, namely an appreciable co-efficient of friction and an adequate resistance to corrosion.

Materials which have individually these special features may be connected to constitute a composite material used for the production of reinforcements for reinforced earth. Thus, the resistance to tractive forces may be supplied by steel or glass wires and resistance to corrosion by a plastic material surrounding the steel or glass, whilst the good co-efficient of friction is obtained by appropriate treatment of the plastic material covering (sanding for example) or by giving a special configuration to the surfaces which are to come into contact with the particles (grooving, scoring, waffling, etc.).

Figure 6:
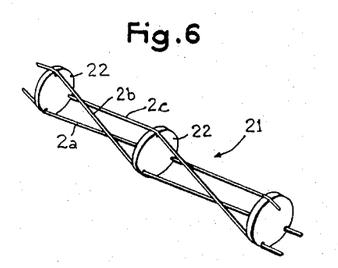
FIG. 6 is a perspective view of a composite reinforcement having a high co-efficient of friction.
Figure 7:
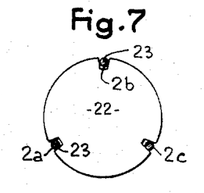
FIG. 7 is a cross-sectional view of the reinforcement along the line 7—7 in FIG. 6.

FIGS. 6 and 7 give an example of reinforcements which have a very high co-efficient of friction. These reinforcements 21 are constituted by an assembly of three steel wires 2a, 2b, 2c and circular spacer discs 22 which are arranged parallel to one another. These discs are provided with three peripheral notches 23 in which are engaged the respective wires, which are supposed to be tensioned. The points of passage for each wire are offset angularly from one spacer disc to the next, in such a manner that between two successive discs there is obtained sheets of wires which are not parallel to the axis of the reinforcement.

Everything is arranged as if the cylinder of earth contained between two spacer discs 22 were integral with the latter. As a result, a reinforcement 21 is equivalent to a cylindrical sheath of the same cross-section as the cross-section of the spacer discs, the co-efficient of friction to be taken into account being the earth-earth co-efficient, which is greater than that of any wire rubbing against the earth.

Figure 8:
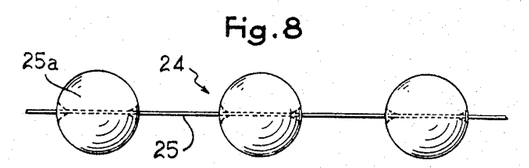
FIG. 8 shows a reinforcement in the form of a string of beads.

The reinforcement 24 shown in FIG. 8 is a chain of the type constituted by a cable 25 on which are fixed balls of concrete 25a in the manner of a string of beads.

Figure 9:
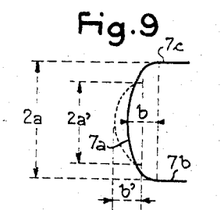
FIG. 9 is diagrammatic sectional view showing a cross-section of a skin element.

*Skin.*—The cylindrical skin elements of FIGS. 4 and 5 comprise a base 7a which, as FIG. 9 shows, is approximately in the form of a semi-ellipse with two semi-axes a, b. Calculation shows that under the action of the pressure of the particles contained in the elements and the internal friction angle of which is designated by $\varphi$, the elliptical profile remains such if a and b are connected by the equation:

$$b = a\sqrt{i}$$

where $i$ is the co-efficient of pressure, equal to:

$$tg^2\left(\frac{\pi}{4} - \frac{\varphi}{2}\right)$$

Figure 10:
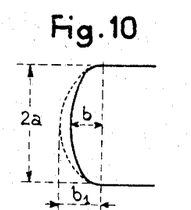
FIG. 10 is a diagrammatic sectional view showing a cross-section of a skin element.

The substantially elliptical form of the cross-section is maintained in a homothetic manner after the packing of the earth in a direction perpendicular to the anchoring planes 7b, 7c as shown in FIG. 9 (where $b' = a'\sqrt{i}$) provided that the properties of the earth do not vary. If the properties of the earth vary, the co-efficient of pressure passing from $i$ to $i_1$, the ratio of the axes of the ellipse also varies as FIG. 10 shows where $b_1 = a\sqrt{i_1}$. In all cases, the envelope remains perfectly stable provided that the mechanical properties of the material constituting it permit of such deformations without risk of fracture. Calculation carried out by conventional methods enables suitable choice of skin properties to be made which will guarantee this stability.

The skin elements 7 are normally constituted by section members of specific length (5 metres for example) which are assembled together end to end in any desired number to match the dimensions of the work being constructed.

Figure 11:
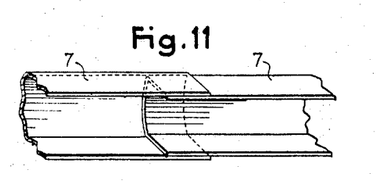
FIG. 11 shows one means of assembling sections and to end for the construction of a skin element.

In FIG. 11, the joint between two adjacent section members is obtained by simple overlapping.

Figure 12:
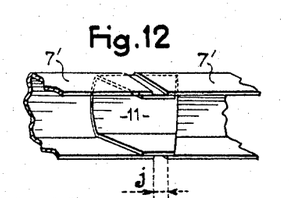
FIG. 12 shows another way of assembling sections end to end for the construction of a skin element.
Figure 13:
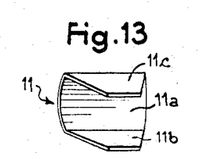
FIG. 13 is a joint cover used in the assembly shown in FIG. 12.

In the example shown in FIGS. 12 and 13, the adjacent ends of two section members to be connected together are separated by a clearance $j$ which enables longitudinal displacements of the elements and within the end zones of the section members there is inserted a joint cover 11 whose cross-section matches that of the section members. The flanges 11b, 11c of this joint cover are given, in the example illustrated, the form of a trapezium the small base of which coincides with the edge of the flange. Thus, the base 11a of this joint cover has with regard to the adjacent section members a large amount of overlap by means of which the pressure of the particles tends to clamp against the joint cover in a sealing-tight manner against the section members.

Figure 14:
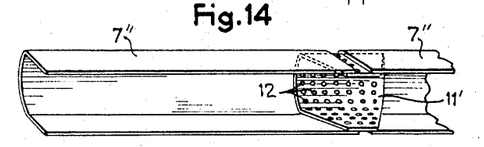
FIG. 14 shows a variant of the joint cover.

This sealing-tightness is ensured both with respect to earth and with respect to water, unless it is desired to provide between the section members "draining joints" in which case joint covers 11 provided with perforations 12 will be used such as that illustrated in FIG. 14. Such perforations can also be provided in the section members themselves.

Figure 15:
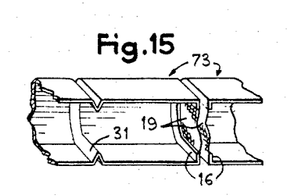
FIG. 15 shows the connection of sections according to another form of embodiment.

In FIG. 15, the connection between two adjacent section members 73 is obtained without any joint covers. The ribs or bent-over edges 16 are simply approached towards one another and a diaphragm 19 is provided which is glued to each rib 16 and covers the entire end cross-section.

Under the pressure of the earth, these two diaphragms are applied against one another in an almost sealing-tight manner. In order to allow considerable longitudinal movements, each section member 73 can be provided with one or more transverse folds 31 forming a kind of expansion bellows.

Instead of diaphragms 19, it would also be possible to connect the edges 16 by any desired means, for example bolts.

Two section members such as 73 could also be connected to one another by fitting the bent-over edge 16 of one of the section members in an end groove of the other section member, similar to the fold 31.

The skin elements which have just been described by way of example are constructed from any desired materials enabling the conditions of strength and flexibility already indicated to be satisfied. The materials suitable for the production of the reinforcements are particularly suitable for producing the skin elements. Typical materials which could be quoted are epoxy or polyester resin laminates or wires of glass fibre, mild steel, rustless steel, and copper. Various plastic materials other than those which have just been mentioned may also be used.

Figure 16:
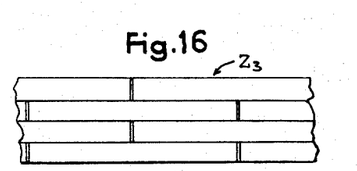
FIG. 16 is an elevational view of a facing provided with a skin formed of superposed sections, with staggered joints.

In FIG. 16 there has been shown by way of example a work $Z_3$ which is seen in elevation and the skin of which is formed of several rows of section members similar to those which have just been described and the joints of which are staggered. These joints could also be arranged in vertical alignment with one another.

Instead of having a smooth surface, two adjacent section members could be corrugated transversely, so as to be capable of being connected to one another by overlapping their corrugations in their end zones.

The skin elements or section members 7 and 73 have been assumed to be rectilinear in their general direction. But it will be apparent that they could be curved, giving them the form of a segment of a torus whose axis is perpendicular to the anchoring planes or parallel thereto. Multiple curvatures could be provided. It would also be possible to provide elements the height of which, measured between anchoring planes, is variable.

It will be noted that the anchoring planes of the skin elements described hereinbefore have a similar function, with respect to the particles of earth, to that of the reinforcements. In certain works, examples of which will be given hereinafter, this particular function of the skin elements makes it possible to dispense with incorporating independent reinforcements.

Figure 17:
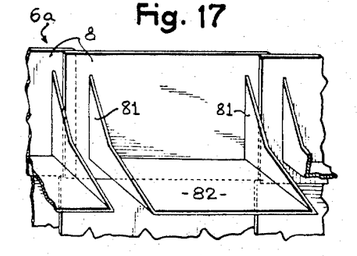
FIG. 17 shows skin elements of overlapping type.

The skin 6 of the work made of reinforced earth may, instead of comprising elements the general form of which is cylindrical or toroidal, be constituted in the manner of imbricated formations of rigid plane or curved plates adapted to be anchored in the particles of the work. FIG. 17 shows a skin $6a$ formed of square plates 8 provided with two ribs 81 connected by a web 82. In order to constitute a face, these plates can be assembled with overlapping, reinforcements formed of flat strips being arranged between the ribs 81 parallel to the web 82 of the plates 8.

Figure 18:
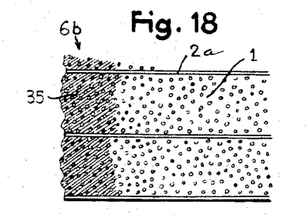
FIG. 18 shows a skin obtained by means of a plastic binding agent.

In FIG. 18, the skin $6b$ is constituted by a plastic binding agent 35 which enrobes the particles 1 situated in the vicinity of the facing. This binding agent may have a base of plastic materials which remain deformable under the loads applied to the works, or else a bitumen or a bituminous binding agent.

In order to contain the particles in the region of a face between two beds of reinforcements, a packing may also be provided in the form of tangled elements of elongated form such as vegetable, mineral or synthetic fibres, or metal strands in random arrangement in the manner of iron shavings, or constructional elements such as those described in the aforesaid patent application. Thus, in the work $Z_4$ shown in FIG. 19, chains of balls 24 are used both as reinforcements and skin elements. These latter forming a coherent zone $6c$ in the vicinity of the surface, by means of successive layers of ball chains. The chains 24 could also be used exclusively for the execution of the skin $6c$.

Figure 20:
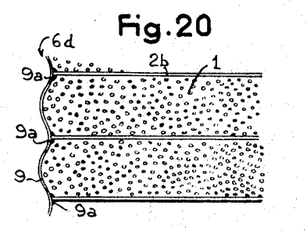
FIG. 20 shows a continuous skin provided with undulations.

Then, FIG. 20 shows a skin $6d$ constituted by a continuous corrugated metal sheet 9 whose corrugations are horizontal, the reinforcements $2b$ being fixed by wells $9a$, or bolts, to the hollows of the corrugations.

Figure 19:
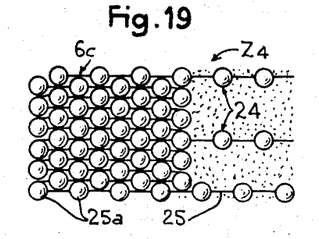
FIG. 19 shows a skin formed of string-of-bead elements.
Figure 21:
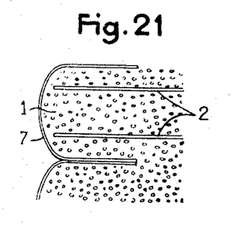
FIG. 21 is a cross sectional view of the cladding showing one means of connecting the reinforcements and the skin elements.

In the arrangements given hereinbefore in FIGS. 5 and 19, the connection of the skin elements and the reinforcements is effected by friction, whether the reinforcements are directly in contact with the anchoring planes or whether connection is obtained by means of particles arranged between the anchoring planes and the reinforcements. This latter case is shown in FIG. 21 where two reinforcements 2 are provided within one and the same section member 7.

Figure 22:
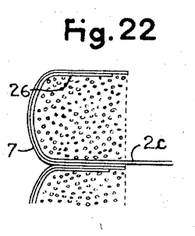
FIG. 22 is a cross sectional view of the cladding showing another means of connecting the reinforcements and the skin elements.

In FIG. 22, the reinforcement $2c$ terminates in a hook 26 which matches the internal shape of the element 7 and increases the connecting surface.

Figure 23:
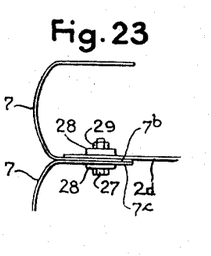
FIG. 23 is a cross sectional view of the cladding showing a third means of connecting the reinforcements and the skin elements.

The connection between the skin elements may be a positive connection obtained by gluing, welding (FIG. 20), rivetting, bolting etc. Thus, FIG. 23 shows a reinforcement $2d$ rendered fast with the adjacent anchoring planes $7b$, $7c$ of two superposed section members 7 by means of a bolt 27, two washers 28 and a nut 29.

(III) *Calculation of the reinforced earth*

The calculation of a work constructed in reinforced earth comprises the three following types of verification:

There must be adhesion or rather friction without slipping between the earth and the reinforcements;

The reinforcements are to withstand tractive forces, and the earth is to withstand compressive stresses and shearing stresses exerted thereon;

The skin elements are to be capable of withstanding the stresses to which they are subjected, bearing in mind their possible deformations.

In order to construct a work of the type shown in FIGURE 4, there are placed on a roughly levelled strip 32 of the foundation soil a first row of skin elements $7'$ having ribs 13 and corresponding joint covers $11'$, and then the first bed of reinforcements $2e$ are positioned. The skin elements being suitably anchored in the soil, the earth is put in place until the level of the upper anchoring plane is reached, this earth being normally extracted from the terrain constituting the foundation soil. This building-up of soil is generally effected with the aid of a bulldozer, a loader or a similar machine. The shield L of the bulldozer introduces the earth within the skin element, compressing it more or less strongly as desired. This operation is carried out without causing any damage to the skin element, owing to the rigidity provided by the ribs 13.

Figure 24:
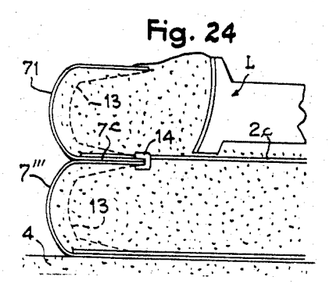
FIG. 24 is a schematic view, partially in cross section showing an example of using reinforced earth.
Figure 25:
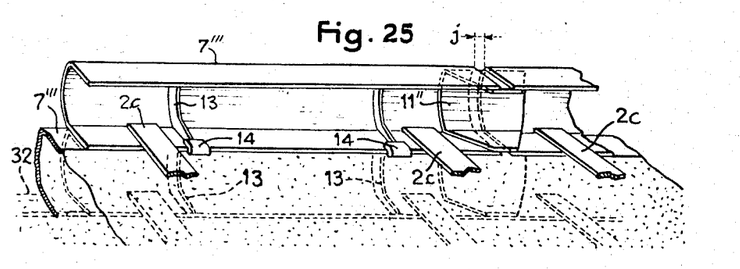
FIG. 25 is a perspective view showing the filling of pulverulent material to build the constructional work.

For the upper rows of skin elements, section members 71 are used which comprise not only ribs 13 but also connecting ribs 14 (FIGURES 24 and 25).

The first row being already laid and filled with earth, the operations of laying the second row are as follows:

Cleaning-away the earth remaining on the upper anchoring planes $7c$ of the first row;

Positioning side by side the section members $l$ of the second row, leaving the necessary joint width $j$ for the longitudinal deformation which may occur, and arranging the ribs 13 of the two rows in vertical alignment with one another;

Positioning the joint covers;

Positioning reinforcements;

Putting the earth in position, this being effected as indicated hereinbefore.

When the bulldozer pushes the earth within the skin element, the said element is to be anchored to the subjacent skin elements, so as to prevent any slipping or knocking-over. This anchoring is effected by means of hooks 14 which are engaged on the face of the subjacent anchoring plane $7c$, level with the two reinforcing ribs 13 (FIGURE 25). The hooks 14 may, if appropriate, be replaced by bolts or any other connecting means.

The bulldozer used for putting the earth in position has a compacting effect on the earth at the same time. In exceptional cases, the compacting can be improved by means of long vibrating pins or, better still, rammers similar to those used in foundries.

A certain number of skin unit elements and a certain number of reinforcements can be assembled in advance before the earth is put in position. They may be assembled in their final position or at a distance there-from. In both cases, but more especially in the event of transport being necessary, it may be necessary to consolidate the assembly with bolts, cables, struts, which have a part to play only during transport or the positioning of the earth. The connection between two prefabricated assemblies is effected by means of the joint covers of the skin elements.

The earth is put in position either hydraulically with suction dredgers which are very economical earth moving machines, or by simply discharging the earth in position free lorries, mechanical shovels, draglines, etc.

If filling is effected with sand, this sand can also be transported by means of pipes through which air flows at a high speed. In certain cases, it is possible to arrange within the skin elements tubular envelopes made of a cheap material (canvas tubes for example) and these envelopes can be filled by air, water or any other means, the filled envelopes holding the skin elements during operations.

The advantage of prefabricated assemblies is particularly great in the case of works which are to be carried out under water; the prefabricated assemblies are positioned side by side and, where appropriate, one above the other; the only work to be executed on the actual site is the positioning of the joint covers, which can be carried out either very rapidly under dry conditions, in the case of a sea work uncovered at low tide, or under water by using skin diving apparatus.

(IV) *Examples of works made of reinforced earth*

Figure 26:
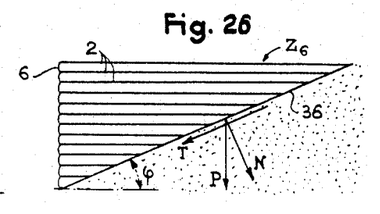
FIG. 26 is a schematic view of the construction and calculation of a triangular wall of reinforced earth.

(1) *Triangular wall, wide at the crest, narrow at the base.*—The wall $Z_6$ shown in FIGURE 26, in the form of a right angled triangle pointing downwards, is particularly well suited to terrains which are found under natural conditions before any work commences, the slope of which forms an angle $\varphi$ which is less than or equal to the natural angle of repose. It will be assumed that the inclination of the slope 36 corresponds to an angle $\varphi$ of 30°.

The wall illustrated comprises a vertical face 6 bounded by skin elements, similar for example to the section members 7, 71 or 73, and it comprises horizontal reinforcements 2.

All that will be examined here will be the case of a dry supporting wall and not the case of a quayside wall which will easily be deduced by varying the value of the density of the earths if the joint covers are of draining type, which has the result of considerably reducing the amount of the reinforcements.

Among arches which can be constructed from reinforced earth, there may be mentioned conventional arch bridges, viaducts, underground passages and tunnels in loose ground and more particularly all kinds of passages which have to be formed below motorway embankments.

Figure 27:
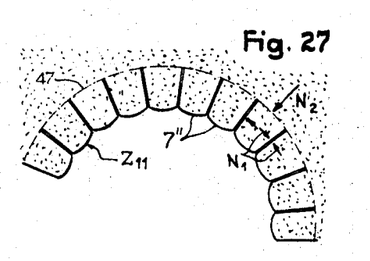
FIG. 27 relates to the construction of an arch in reinforced earth.

Vaults are very easy to construct in reinforced earth, and it is often possible to construct them in the manner shown in the case of the small valut $Z_{11}$ of FIGURE 27, using only skin elements the anchoring planes of which act as reinforcements. Under these conditions, it is sufficient to arrange all the skin elements in an arc of a circle on two circular templates and then to fill all of them with earth.

The volume of reinforced earth is bounded by the visible intrados and by the cylinder having as its directrix the line 47 joining the ends of the anchoring planes. The arc corresponding to this volume is to be in equilibrium due to the effect of external actions.

It is possible to construct all kinds of foundation works in reinforced earth, from simple slabs (for roads or airfield runways) to sills, aprons or wells.

It should be realised first of all that an only slightly clayey earth suitably compacted cannot substantially be further packed. Consequently, if a volume of foundation soil suitably compacted is sufficiently reinforced to resist the stresses to which it is subjected, its behaviour will be little different from that of a similar work made of reinforced concrete.

Foundation works can be particularly economical since in most cases they do not require any skin elements as in the example of the pillar foundation $Z_2$ of FIGURE 3 where everything is as if what were concerned was a proper rigid sill bounded by the broken line 3.

Only the case of a pillar subjected to a normal stress without bending will be considered here, the case of bending phenomena being treated in the following example which is devoted to a beam.

Figure 28:
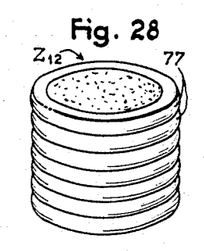
FIG. 28 relates to the construction of a pillar of reinforced earth.

The pillar $Z_{12}$ shown in FIGURE 28 is cylindrical in form, obtained by stacking skin elements 77 of toroidal form the cross-section of which is similar to that of the section members 7 and 73.

Under these conditions, there is no grid of horizontal reinforcements and the toroidal elements 77 act as skin elements and as reinforcements also.

Figure 29:
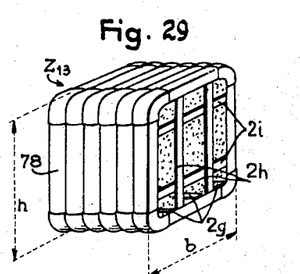
FIG. 29 shows in perspective a part of a beam of reinforced earth which is of rectangular cross-section.

The beam $Z_{13}$ shown partially and diagrammatically in FIGURE 29 is bounded by a skin constituted of elements 78 of U-shaped cross-section, in the form of rectangular and juxtaposed frames. It comprises reinforcements $2g$, $2h$, $2i$ arranged in three directions each two of which are perpendicular to one another.

The calculation of a beam of this kind, which has cross-sections subjected to considerable bending moments, is similar to that for reinforced concrete.

Therefore, it may be advantageous to construct beams of reinforced earth which are intended to withstand very heavy loads, by using simple tubes or cylinders filled with earth found on the actual site. These cylinders or tubes could be made of light plastic material more particularly for building sites or work of a military character.

Many small-scale models of beams have been constructed and it has been found that a beam of reinforced each constructed with sand and paper was perfectly elastic and could withstand considerable live loads.

One of these beams, $Z_{15}$ (FIGURES 30, 31), has as its skin a cylinder 79 of transparent tracing paper reinforced at its lower portion with a single longitudinal reinforcement $2f$ made of thirty layers of adhesive tape of 1.9 cm. in width, the lower layer being glued to the skin. These layers had a decreasing length in the upward direction so that the maximum width was reached in the centre. Adhesive paper 79a the turns of which were abutting on one another in the middle and were very loose near the supports surrounded the skin cylinder helically. The free bearing surface was 30 cm. and the diameter 6 cm.

Figure 30:
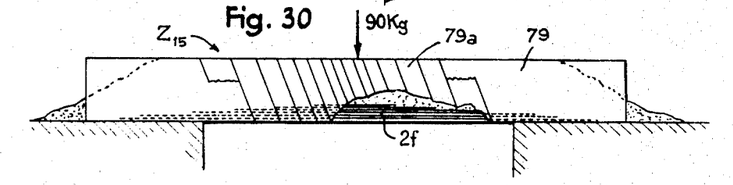
FIG. 30 is a side elevational view, partially in cross section of longitudinal section and in a small-scale model of a beam of reinforced earth of circular cross-section.
Figure 31:
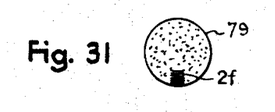
FIG. 31 is a transverse cross sectional view of the beams in FIG. 30.

For a first load of 3 kg. at the centre, the beam underwent a deflection of 1 mm. and returned elastically in a perfect manner after the load was removed. This perfect elasticity was also found in the case of a load of 20 kg. at the centre; for a load of 40 kg. it was found that there was a slight permanent deflection. Finally, it was possible to increase the load up to 90 kg. without fracture but with a permanent deflection of 1 cm. No change in form in the section was found to have occurred at the centre, which appears to confirm the hypothesis of a substantially uniform compression of the earth in one section.

Of course, the examples which have just been given are not intended to be limitative in any way, and it is possible to use reinforced earth to construct works, parts of works, constructional elements, etc. of forms different from those which have been described here. Thus, it is possible to construct by methods of the present invention volumes which comprise curved portions or re-entrants.

Having now described my invention what I claim as new and desire to secure by Letters Patent is:

1. Constructional work comprising a mass of particulate elements to be reinforced, said particulate elements being pulverulent and being normally capable of lateral slippage relative to one another, and reinforcing elements embedded in said mass in a movable relation with respect to each other, said reinforcing elements each being elongated and pliable and having a substantially uniform cross section shape with opposite surfaces throughout a major portion of its length, thereby allowing migration of said particulate elements along the surfaces of said reinforcing elements during construction of said work, said reinforcing elements being capable of sustaining tension without permanently elongating and without fracture, a multiplicity of said particles being in direct frictional engagement with one of the opposite surfaces of one of said reinforcing elements and defining a first layer, a multiplicity of other particles being in direct engagement with the opposite surface of an adjacent reinforcing element that is opposed to said one opposite surface and defining a second layer, said layer engaging opposite surfaces being spaced apart in opposed relation along the length thereof in a direction perpendicular to the length of their respective reinforcing elements, and an intermediate portion of said mass consisting of a multiplicity of still other particles being interposed in a continuous and uninterrupted mass between and contiguous with said first and second particle layers and forming a particulate mass therewith, said particulate mass being compressed between said reinforcing elements with sufficient force to prevent its slippage longitudinally of said reinforcing elements, said layer engaging opposite surfaces having a width at least as great as the thickness of said respective reinforcing elements, whereby the friction between the particulate mass and the reinforcing elements consolidates the mass of said constructional work.

2. The constructional work according to claim 1 whereing said mass has oppositely spaced terminal surfaces, and means for retaining said mass along at least one of said terminal surfaces, whereby said particles adjacent said terminal surfaces are supported independently of said reinforcing elements.

3. The constructional work according to claim 2 wherein said retaining means is a skin, said skin having sufficient strength to retain said particles in said mass, and said skin being connected with said elements.

4. The constructional work according to claim 2 wherein said retaining means includes a plurality of channel members having opposed flanges, and channel members being superimposed on one another to define a wall, said flanges of adjcent channel members being in juxtaposed relation to each other, whereby said channel members cooperate to form cladding for said mass.

5. The constructional work according to claim 4 wherein said channel members include a web portion interconnecting said flanges, some of said particles filling said channel members, said web portion being curved outwardly from said mass, whereby said members are deformable by forces in a direction perpendicular to said flanges and relatively undeformable by forces in a direction away from said mass.

6. Constructional work comprising:
a mass of pulverulent, discrete particles, said particles being normally capable of lateral slippage relative to one another,
a plurality of pliable reinforcing elements embedded in said mass, said elements being elongated and being spaced apart from each other and having opposed surfaces, each of said opposed surfaces having a width at least as great as the thickness of its respective reinforcing elements,
said mass having opposite spaced terminal surfaces, said elements each extending from adjacent one of said mass surfaces to the other of said mass surfaces, said elements each having an external perimeter of each element having a substantially uniform shape throughout the length of said elements, said particles defining a continuous layer enclosing individually the exterior of each of said elements, additional particles extending in a continuous and uninterrupted mass between respective layers of adjacent ones of said elements, said layer particles and said additional particles being subjected to sufficient pressure between opposed surfaces of said adjacent ones of said elements to prevent slippage longitudinally of said reinforcing elements, whereby the friction between said particles and said reinforcing elements consilidates said mass between said opposite terminal surfaces.

7. The constructional work according to claim 6 wherein said reinforcing elements are thin bands of metal, said bands being capable of sustaining longitudinal tensile stress due to said pressure without plastic deformation and without fracture.

8. The constructional work according to claim 6 including means for retaining said particles in said mass adjacent at least one of said terminal surfaces.

9. The constructional work according to claim 8 wherein said retaining means includes an integral mass of earth along at least one of said terminal surfaces of said mass of particles, whereby those of said particles adjacent said earth mass are retained by the earth mass are retained by the earth mass.

10. The constructional work according to claim 8 wherein said retaining means is a skin, said skin having sufficient strength to retain said particles in said mass, and said skin being connected with said elements.

11. The constructional work according to claim 8 wherein said retaining means includes a pluarilty of channel members having opposed flanges, said channel members being superimposed on one another to define a wall, said flanges of adjacent channel members being in juxtaposed relation to each other, whereby said channel members cooperate to form cladding for said mass.

12. The constructional work according to claim 11 wherein said retaining means includes a plurality of channel members having opposed flanges, said channel members being superimposed on one another to define a wall, said flanges of adjacent channel members being in juxtaposed relation to each other, whereby said channel members cooperate to form cladding for said mass.

13. Constructional work consisting of a mass of first elements, second elements embedded in said mass, the elements being maintained relative to each other solely by the effect of friction between elements which are in contact, the first elements being particles, and the second elements being pliant substantially solid elongate reinforcements, and substantially U-sectioned elements, of flexible sheet material filled with some of said particles, each U-sectioned element having an outwardly convex web portion and two plane flanges, the flanges of the U-sectioned elements being in juxtaposed relation to each other so as to constitute an outer cladding for an outer surface of said mass, each U-sectioned element including a plurality of substantially U-sectioned members in longitudinal alignment with each other, the ends of adjacent aligned U-sectioned members forming a gap therebetween, and a joint cover being engaged in said ends and closing said gap.

14. Constructional work as claimed in claim 13, wherein the joint cover includes perforations therein.

15. Constructional work consisting of a mass of first elements, second elements in said mass, the elements being maintained relative to each other solely by the effect of friction between elements which are in contact with no binder therebetween, the first elements being particles, and the second elements being flexible substantially solid elongate reinforcements, and substantially U-sectioned elements of flexible sheet material filled with some of said particles, each U-sectioned element having an outwardly convex web portion and two plane flanges, the flanges of the U-sectioned elements being in juxtaposed relation to each other so as to constitute an outer cladding for an outer surface of said mass, each U-sectioned element including a plurality of substantially U-sectioned members in longitudinal alignment with each other, the ends of adjacent aligned U-sectioned members each being provided with a diaphragm, the diaphragms being clamped against one another in a sealing-tight manner by the pressure of said particles.

16. Constructional work consisting of a mass of earth particles, substantially solid long thin bands of reinforcement having a high tensile strength and arranged in vertically spaced substantially horizontal planes, said bands having their wide faces substantially coplanar with said planes and being embedded in and in close frictional contact with said earth particles on both of the wide faces of said bands, the number and total volume of said bands corresponding to a minimum theoretical volume multiplied by a maximum factor of safety of 10, said theoretical volume being consistent with a frictional contact of the surface of said bands with adjoining earth particles which prevents slip between said bands and said particles under the effect of tensile forces exerted by said adjoining particles on said bands due to internal stresses set up in said mass by the weight of said constructional work and by forces resulting from the service conditions for which said constructional work is designed and moreover consistent with a tensile load capacity of said bands which corresponds solely to the elastic resistance that said bands are designed to oppose to said tensile forces before reaching the elastic limits of said bands, whereby the shape of said constructional work is retained elastically by cheap light and easily handled reinforcements, said mass having an upwardly extending outer face and a cladding for said outer face, said cladding comprising a series of superimposed substantially horizontal elongate U-sectioned channel members of flexible sheet material, each U-sectioned member having two plane flanges substantially parallel to said planes of bands and a curved web portion interconnecting the flanges, particles of said earth filling said U-sectioned members and said flanges extending into said mass of earth particles so as to be frictionally retained by said particles, said bands having one of their ends connected to said U-sectioned members and their other ends freely disposed in said mass, said curved web portions being convex on the side of the U-sectioned members remote from said mass whereby said U-sectioned members offer higher resistance to horizontal forces outward of said mass than to vertically downward forces and said cladding can follow downward deformation of said mass.

References Cited

UNITED STATES PATENTS

| | | | |
|---|---|---|---|
| Re. 18,104 | 6/1931 | Levering | 61—30 |
| 776,799 | 12/1904 | Reed | 61—30 |
| 832,371 | 10/1906 | Fiestedt | 61—2 |
| 1,762,343 | 6/1930 | Munster | 61—39 |
| 1,951,292 | 3/1934 | Cahill | 61—34 X |
| 1,968,993 | 8/1934 | Cox | 61—35 |
| 2,056,349 | 10/1936 | Evers | 61—39 |
| 2,138,037 | 11/1938 | Lane | 61—35 |
| 2,145,396 | 1/1939 | Kato | 61—30 |
| 2,184,462 | 12/1939 | Milliken | 61—39 X |
| 2,193,425 | 3/1940 | Lake | 61—35 X |
| 2,261,715 | 11/1941 | Clark | 61—35 |
| 2,405,289 | 8/1946 | Caldwell | 61—39 |
| 3,226,933 | 1/1966 | White | 61—39 |

FOREIGN PATENTS

| | | |
|---|---|---|
| 334,177 | 1/1936 | Italy. |
| 1,165,317 | 5/1958 | France. |

EARL J. WHITMER, *Primary Examiner.*

U.S. Cl. X.R.

61—30, 35

UNITED STATES PATENT OFFICE
CERTIFICATE OF CORRECTION

Patent No. 3,421,326                          January 14, 1969

Henri Charles Vidal

It is certified that error appears in the above identified patent and that said Letters Patent are hereby corrected as shown below:

Column 11, line 44, "and" should read -- said --; line 71, before "of" insert -- in cross section, said perimeter --. Column 12, line 7, "consilidates" should read -- consolidates --; line 21, cancel "are retained by the earth mass"; line 28, "pluarilty" should read -- plurality --.

Signed and sealed this 31st day of March 1970.

(SEAL)
Attest:

Edward M. Fletcher, Jr.                      WILLIAM E. SCHUYLER, JR.
Attesting Officer                              Commissioner of Patents